United States Patent Office 3,422,040
Patented Jan. 14, 1969

3,422,040
CATALYTIC POLYMERIZATION OF CYCLIC ALKYLENE OXIDES
Hideo Tomomatsu, Austin, Tex., assignor to Jefferson Chemical Company, Inc., Houston, Tex., a corporation of Delaware
No Drawing. Filed Aug. 21, 1967, Ser. No. 661,838
U.S. Cl. 260—2                                      9 Claims
Int. Cl. C08g 23/14

ABSTRACT OF THE DISCLOSURE

High molecular weight polymers having a high degree of crystallinity are obtained from the polymerization of cyclic alkylene oxides employing a binary catalyst system consisting of an organometallic compound wherein the metal is selected from Groups II and III A of the Periodic Table of Elements and aluminum formate. Cyclic alkylene oxides employed are those containing oxygen-carbon rings consisting of one oxygen atom in a ring with two or three carbon atoms.

---

This invention is concerned with the polymerization of cyclic alkylene oxides using a binary catalyst system of an organometallic compound and aluminum formate.

The polymerization of alkylene oxides is well known. For many years low molecular weight polymers have been obtained by the polymerization of alkylene oxides in the presence of alkaline catalysts. More recently, efforts have been made to obtain tough, solid polymeric alkylene oxides having molecular weights of one million or more.

When alkylene oxides having side chains, such as propylene oxide and epichlorohydrin, are employed, the polymerization may yield both stereoregular and stereoirregular polymers, depending mainly on the polymerization catalyst employed. Stereoregular polymers are crystalline, while stereoirregular polymers are amorphous. For some purposes, crystalline polymers are more desirable. Thus, at times it is important not only to obtain polymers of extremely high molecular weights but also to obtain polymers containing a high percentage of stereoregular polymer.

Organometallic compounds of the type employed in my catalyst system (specifically diethyl zinc) have been reported to have no catalystic activity in the polymerization of oxides when used alone (J. Furukawa et al., J. Polymer Sci., 36, 542 (1959)). Therefore, it was entirely unexpected that by mixing these organometallic compounds with aluminum formate, which also has no catalytic activity when used alone, a high yield of high molecular weight polymer containing a high percentage of stereoregular polymer could be obtained.

*Summary of the invention*

I have now developed a method for the polymerization of cyclic alkylene oxides whereby high molecular weight polymers having a high degree of crystallinity may be obtained. In accordance with my method a binary catalyst system of aluminum formate and an organometallic compound as defined hereinbelow is employed.

DESCRIPTION OF THE PREFERRED EMBODIMENT

One component of my catalyst system is aluminum formate. Commercially available aluminum formate may be employed without the need for purification.

The organometallic compound to be used in conjunction with the aluminum formate is defined as one having the formula $MZX_{y-1}$ wherein M is a metal belonging to Groups II and III, and preferably Groups IIB and IIIA, of the Periodic Table, Z is a member selected from the group consisting of alkyl, cycloalkyl and aryl groups containing from 1 to 18 carbon atoms, X is selected from the class consisting of hydrogen, halogen, Z and alkoxy and aryloxy groups containing 1 to 18 carbon atoms, and y is a whole number equal to the valence of M. This metallic compound will contain at least one alkyl or aryl group and may contain additional such groups or alkoxy, aryloxy, hydrogen or a halogen such as chlorine, bromine or iodine. Examples of M include magnesium, calcium, strontium, barium, zinc, cadmium and aluminum. Typical examples of Z include methyl, ethyl, phenyl, butyl, hexyl, cyclobutyl, cyclohexyl and tolyl. Z is preferably an alkyl group. In addition to the above groups, X may be hydrogen, chlorine, bromine, iodine, ethoxy, propoxy, butoxy and phenoxy. Especially preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The cyclic alkylene oxides that may be polymerized by my process are those containing oxygen-carbon rings in which one oxygen atom is combined with two or three carbon atoms in the ring. The ring carbon atoms may be substituted with alkyl, aryl, cycloalkyl, alkoxyl and haloalkyl groups. The most common cyclic alkylene oxides are those containing the three-membered oxirane ring. Examples of such oxides include ethylene oxide, 1,2-propylene oxide, 1,2-butylene oxide, 2,3-butylene oxide, 1,2-dodecene oxide, styrene oxide, epichlorohydrin and allyl glycidyl ether. A typical four-membered alkylene oxide is 1,3-propylene oxide, commonly referred to as oxetane. Other such cyclic oxides include 3,3-dimethyloxetane, 3,3-diethyloxetane and 3,3-di(chloromethyl)oxetane.

The concentration of the mixed catalyst may be varied from 1 to 20 wt. percent or higher based on the weight of the monomeric oxide. It is preferred to use from about 5 to 10 wt. percent catalyst. The weight ratio of aluminum formate to organometallic compound in the catalyst may be varied from about 10:1 to 1:10 with the preferred ratio being from about 1:2 to 2:1 with a ratio of about 1:1 being particularly preferred.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

After the polymerization is complete the catalyst may be quenched by the addition of a suitable amount of a lower aliphatic alcohol, preferably isopropyl alcohol, in solution in an inert solvent as described above. Generally, sufficient alcohol is used to react with both components of the catalyst system. The presence of the quenched catalyst in the polymer does not adversely affect the polymer properties. It is also possible to add a small amount of antioxidant (usually 0.3 to 3.0 wt. percent based on the monomeric oxide) in solution in a solvent to increase the stability of the polymer.

To demonstrate the unexpected synergistic effect shown by my two-component catalyst system, propylene oxide was polymerized using aluminum formate alone, diethyl zinc alone, and a combination of aluminum formate with diethyl zinc. These polymerizations were conducted in cyclohexane solvent at 80° C. for a period of 24 hours. The results of these experiments are summarized in Table 1. The intrinsic viscosity of the polymers was observed in toluene at 25° C. Fractionation of the polymer to determine the crystalline content was carried out by dissolving the polymer in sixty times its weight of acetone and precipitating the crystalline fraction by cooling the solution to −45° C.

TABLE 1

| Run No. | Compound | Conc. based on propylene oxide, percent | Total polymer | | | Crystalline fraction, percent |
|---|---|---|---|---|---|---|
| | | | Yield, percent | Intrinsic viscosity | Avg. mol. wt. | |
| 1 | Aluminum formate | 4.18 | 0 | | | |
| 2 | Diethyl zinc | 5.0 | 0 | | | |
| 3 | Aluminum formate plus diethyl zinc | 4.18+5.0 | 90 | 5.9 | $1.64 \times 10^6$ | 51 |

Binary catalyst systems of diethyl zinc and activated alumina and diethyl zinc and aluminum isopropoxide monomer have also been previously reported. However, the results obtained using these previously reported binary systems are greatly inferior to the results obtained using the binary systems of the present invention. For example, when 4.3% activated alumina and 5% diethyl zinc were employed under the conditions of the runs reported in Table 1, the total yield of polymer was only 20%. Using 4.3% aluminum isopropoxide monomer and 3.8% diethyl zinc under the same conditions gave a total yield of polymer of only 8.8%.

My invention will be further illustrated by the following example.

Example I

Commercially available aluminum formate (2.09 grams) was placed in a 1,000 ml. Pyrex glass pressure bottle under dry nitrogen. To this was added 200 grams of freshly distilled, dried cyclohexane and the mixture was stirred under airtight conditions to a slightly turbid mixture. A 25% solution of diethyl zinc in heptane (10 grams) was added, and after complete mixing 50 grams of freshly distilled propylene oxide was added. The pressure bottle was closed by a stainless steel cap equipped with a Teflon O-ring and was subjected to shaking in an oil bath at 80° C. for 24 hours. At the end of this time the reaction mixture was a white, heavily viscous gel. The reaction mixture was mixed with 50 ml. of cyclohexane which contained 0.25 gram of isopropyl alcohol and 0.25 gram of dibutyl-pararcresol. After this mixture had been left standing for several hours, it was poured on aluminum foil to allow the solvent to evaporate. In this way there was obtained 49 grams of a white, tough, rubbery material. The intrinsic viscosity of the polymer determined in toluene at 25° C. was 5.9. The molecular weight calculated from the intrinsic viscosity was $1.7 \times 10^6$.

Example II

Aluminum formate (2.09 grams) was mixed with 200 ml. of dried benzene, and to this mixture was added 10 grams of a 25% solution of triethyl aluminum in toluene. The mixture was stirred well under a dry nitrogen atmosphere and 50 grams of freshly distilled epichlorohydrin was added. The pressure bottle was closed by a stainless steel cap equipped with a Teflon O-ring and subjected to shaking in an oil bath at 80° C. for 24 hours. After evaporation of the solvent there remained 38 grams of a yellow, rubbery product.

I claim:

1. A method for the polymerization of a cyclic alkylene oxide having an oxygen-carbon ring in which the oxygen atom is joined with 3 carbon atoms in the ring, which comprises mixing said oxide at 0° to 200° C. in an inert atmosphere with from 1 to 20 wt. percent based on the weight of oxide of a binary catalyst system of
   (A) aluminum formate with
   (B) an organometallic compound having the formula $$MZY_{y-1}$$ 

wherein M is magnesium, calcium, strontium, barium, zinc, cadmium and aluminum, Z is selected from the class consisting of aryl, cycloalkly and alklyl groups containing from 1 to 18 carbon atoms, X is selected from the class consisting of hydrogen, halogen, Z and alkoxy and aryloxy groups containing 1 to 18 carbon atoms, and Y is an integer equal to the valence of M, the weight ratio of aluminum formate to organometallic compound in the catalyst mixture being within the range of from 10:1 to1:10.

2. A method as in claim 1 wherein the temperature is within the range of 25° to 150° C. and the catalyst concentration is within the range of 5 to 10 wt. percent based on the weight of oxide and the weight ratio of aluminum formate to organometallic compound is within the range of 2:1 to 1:2.

3. A method as in claim 1 wherein Z is an alkyl group containing 1 to 18 carbon atoms.

4. A method as in claim 3 wherein the organometallic compound is diethyl zinc.

5. A method as in claim 4 wherein the temperature is within the range of 25° to 150° C., the concentration of the catalyst mixture is between 5 to 10 wt. percent based on the weight of oxide and the weight ratio of aluminum formate to diethyl zinc is between 2:1 and 1:2.

6. A method as in claim 3 wherein the organometallic compound is triethyl aluminum.

7. A method as in claim 6 wherein the temperature is within the range of 25° to 150° C., the catalyst concentration is between 5 to 10 wt. percent based on the weight of oxide and the weight ratio of aluminum formate to triethyl aluminum is between 2:1 and 1:2.

8. A method as in claim 1 wherein the alkylene oxide is propylene oxide.

9. A method as in claim 1 wherein the alkylene oxide is epichlorohydrin.

References Cited

UNITED STATES PATENTS 2,870,100  1/1959  Stewart et al. _____ 260—2
2,934,505  4/1960  Gurgiolo _____ 260—2

WILLIAM H. SHORT, Primary Examiner.

T. PERTILLA, Assistant Examiner.

U.S. Cl. X.R.

260—88.3